(12) United States Patent
Hsu et al.

(10) Patent No.: US 12,125,221 B2
(45) Date of Patent: Oct. 22, 2024

(54) METHOD AND SYSTEM FOR DETECTING A THREE-DIMENSIONAL OBJECT IN A TWO-DIMENSIONAL IMAGE

(71) Applicant: MERIT LILIN ENT. CO., LTD., New Taipei (TW)

(72) Inventors: Cheng-Chung Hsu, New Taipei (TW); Chih-Kang Hu, New Taipei (TW); Chi-Yen Cheng, New Taipei (TW); Chia-Wen Ho, New Taipei (TW); Jin-De Song, Taipei (TW)

(73) Assignee: MERIT LILIN ENT. CO., LTD., New Taipei (TW)

( * ) Notice: Subject to any disclaimer, the term of this patent is extended or adjusted under 35 U.S.C. 154(b) by 380 days.

(21) Appl. No.: 17/678,725

(22) Filed: Feb. 23, 2022

(65) Prior Publication Data
US 2023/0068375 A1   Mar. 2, 2023

(30) Foreign Application Priority Data
Aug. 27, 2021   (TW) .................................. 110131917

(51) Int. Cl.
G06K 9/00       (2022.01)
G06T 7/50       (2017.01)
G06T 7/60       (2017.01)
G06T 7/73       (2017.01)

(52) U.S. Cl.
CPC .............. *G06T 7/50* (2017.01); *G06T 7/60* (2013.01); *G06T 7/73* (2017.01); *G06T 2207/20081* (2013.01); *G06T 2207/20084* (2013.01); *G06T 2207/30204* (2013.01)

(58) Field of Classification Search
CPC ....................................................... G06T 7/50
See application file for complete search history.

(56) References Cited

U.S. PATENT DOCUMENTS

| | | | | |
|---|---|---|---|---|
| 6,597,363 | B1* | 7/2003 | Duluk, Jr. | G06T 15/50 345/506 |
| 2002/0101430 | A1* | 8/2002 | Duquesnois | G06T 15/04 345/581 |
| 2013/0083019 | A1* | 4/2013 | Chang | G06F 40/00 345/420 |
| 2016/0140741 | A1* | 5/2016 | George | G06T 11/40 345/441 |
| 2017/0315992 | A1* | 11/2017 | Sanders | G06T 19/00 |
| 2023/0068375 | A1* | 3/2023 | Hsu | G06T 7/73 |

\* cited by examiner

*Primary Examiner* — Hadi Akhavannik
(74) *Attorney, Agent, or Firm* — HSML P.C.

(57) ABSTRACT

A method for detecting a three-dimensional object in a two-dimensional image includes: inputting the two-dimensional image into an object detection model, and obtaining a resulting detection depth dataset; obtaining, based on the detection depth dataset, coordinate sets of a number of points-of-interest each associated with a to-be-detected object in a 3D camera centered coordinate system; and converting the coordinate sets of the number of points-of-interest in the 3D camera centered coordinate system into a number of coordinate sets in a 3D global coordinate system. Embodiments of this disclosure may be utilized in the field of self-driving cars with roadside traffic cameras.

12 Claims, 6 Drawing Sheets

METHOD AND SYSTEM FOR DETECTING A THREE-DIMENSIONAL OBJECT IN A TWO-DIMENSIONAL IMAGE

CROSS-REFERENCE TO RELATED APPLICATION

This application claims priority of Taiwanese Patent Application No. 110131917, filed on Aug. 27, 2021.

FIELD

The disclosure relates to a method and a system for detecting a three-dimensional object in a two-dimensional image.

BACKGROUND

Conventionally, object detection in two-dimensional images involves using a convolutional neural network (CNN) or other neural networks to obtain a plurality of object features included in one two-dimensional image, so that a bounding box (typically having a rectangular shape) of the two-dimensional image that contains an object can be determined based on the object features.

It is noted that in some applications (e.g., real-time vehicle detection), it may be beneficial to further obtain three-dimensional features of an object in a two-dimensional image.

SUMMARY

Therefore, an object of the disclosure is to provide a method for detecting a three-dimensional object in a two-dimensional image.

According to one embodiment of the disclosure, the method includes the steps of:
inputting a to-be-detected image that includes a to-be-detected object into an object detection model, and obtaining a resulting output of the object detection model that includes a detection depth dataset, the detection depth dataset including a regional subset associated with a 2D bounding box bounding the to-be-detected object and a depth marking subset associated with the regional subset, the depth marking subset including a coordinate set of a detected reference point associated with the to-be-detected object, a length of the to-be-detected object, a first angle defined by a reference line that crosses the detected reference point and that is parallel to an edge of the 2D bounding box and a first line that originates from the detected reference point and that extends along the length of the to-be-detected object, a width of the to-be-detected object, a second angle defined by the reference line and a second line that originates from the detected reference point and that extends along the width of the to-be-detected object, a height of the to-be-detected object, and a third angle defined by the reference line and a third line that originates from the detected reference point and that extends along the height of the to-be-detected object;
performing a calculation operation based on the detection depth dataset, so as to obtain coordinate sets of a number of points-of-interest each associated with the to-be-detected object in the to-be-detected image, in a three-dimensional (3D) camera centered coordinate system; and
performing a mapping operation to convert the coordinate sets of the number of points-of-interest in the 3D camera centered coordinate system into a number of coordinate sets, respectively, in a 3D global coordinate system.

Another object of the disclosure is to provide a system that is configured to implement the above-mentioned method.

According to one embodiment of the disclosure, the system includes:
a storage medium;
an image capturing module configured to continuously capture images and to transmit the images to the storage medium; and
a calculating module that is configured to
access the storage medium to obtain a to-be-detected image that includes a to-be-detected object,
input a to-be-detected image into an object detection model, and obtain a resulting output of the object detection model that includes a detection depth dataset, the detection depth dataset including a regional subset associated with a 2D bounding box bounding the to-be-detected object and a depth marking subset associated with the regional subset, the depth marking subset including a coordinate set of a detected reference point associated with the to-be-detected object, a length of the to-be-detected object, a first angle defined by a reference line that crosses the detected reference point and that is parallel to an edge of the 2D bounding box and a first line that originates from the detected reference point and that extends along the length of the to-be-detected object, a width of the to-be-detected object, a second angle defined by the reference line and a second line that originates from the detected reference point and that extends along the width of the to-be-detected object, a height of the to-be-detected object, and a third angle defined by the reference line and a third line that originates from the detected reference point and that extends along the height of the to-be-detected object,
perform a calculation operation based on the detection depth dataset, so as to obtain coordinate sets of a number of points-of-interest each associated with the to-be-detected object in the to-be-detected image, in a three-dimensional (3D) camera centered coordinate system, and
perform a mapping operation to convert the coordinate sets of the number of points-of-interest in the 3D camera centered coordinate system into a number of coordinate sets, respectively, in a 3D global coordinate system.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
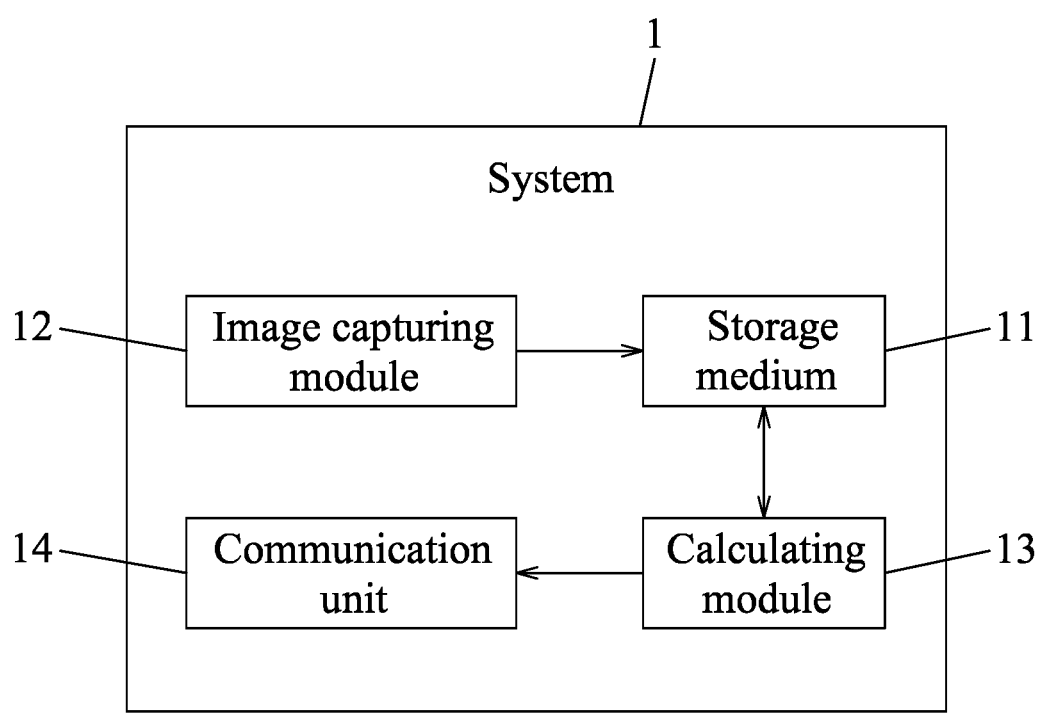
FIG. 1 is a block diagram illustrating components of a system for detecting a three-dimensional object in a two-dimensional image according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating components of a system 1 for detecting a three-dimensional (3D) object in a two-dimensional (2D) image, according to one embodiment of the disclosure. In this embodiment, the system 1 includes a storage medium 11, an image capturing module 12 and a calculating module 13.

In this embodiment, the storage medium 11 may be embodied using, for example, random access memory (RAM), read only memory (ROM), programmable ROM (PROM), firmware, flash memory, etc.

The image capturing module 12 is coupled to the storage medium 11, and is configured to be capable of continuously capturing images. In this embodiment, the image capturing module 12 may be embodied using a complementary metal-oxide-semiconductor (CMOS) camera, and is configured to transmit the images captured thereby to the storage medium 11 for storage.

In some embodiments, the image capturing module 12 is configured to encode the images using a YUV color encoding system and then transmit encoded images to the storage medium 11.

The calculating module 13 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. In this embodiment, due to the amount of calculation involved with images having relatively higher resolutions, a graphics processing unit (GPU) may be employed. It is noted that in some embodiments, the storage medium 11 and the calculating module 13 may be integrated as a cloud computing host.

It is noted that in some embodiments, the system 1 may further include a communication unit 14 that is coupled to the calculating module 13. The communication unit 14 may include at least one of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fifth generation (5G) of wireless mobile telecommunications technology, and/or the like.

The storage medium 11 stores a plurality of training datasets therein. Each of the training datasets includes a training 2D image, at least one marked area that is on the training 2D image and that indicates a location of an object in the training 2D image, and at least one depth sub-dataset that is associated with the marked area.

Figure 2:
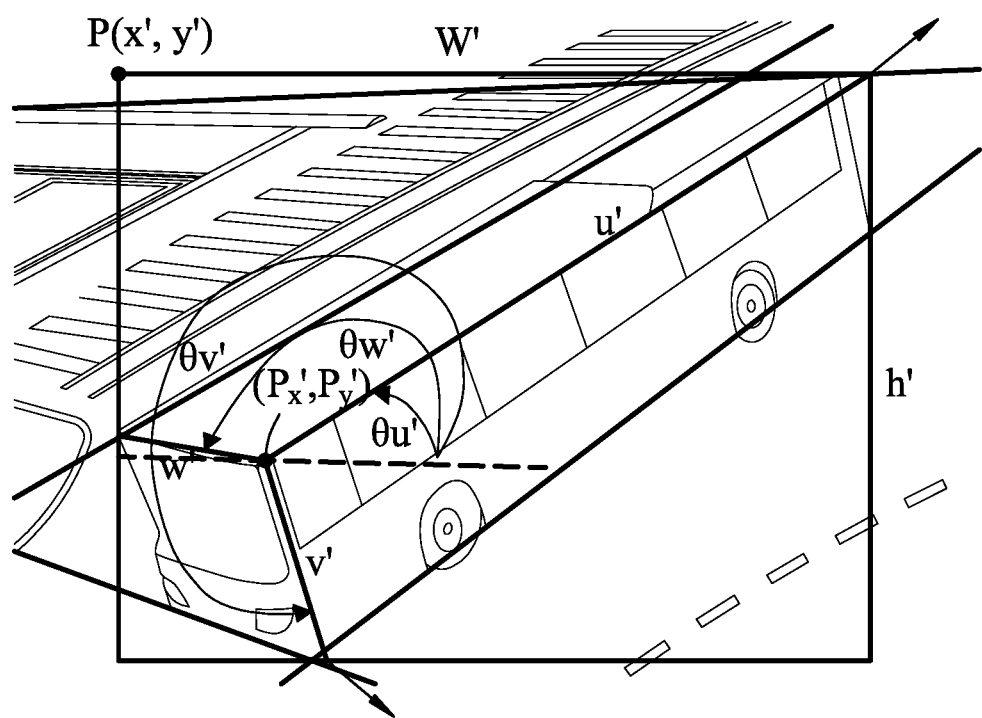
FIG. 2 illustrates an exemplary training two-dimensional image.

The training 2D image may be an image on the road, as obtained by the image capturing module 12, and may include one or more objects therein. FIG. 2 illustrates an exemplary training 2D image with one object (i.e., a bus) of interest.

The depth sub-dataset may include a coordinate set of a reference point (Px',Py'), a length of the object (u'), a first angle $\theta_u'$ with respect to a lengthwise direction of the object, a width of the object (w'), and a second angle $\theta_w'$ with respect to a widthwise direction of the object, a height of the object (v'), a third angle $\theta_v'$ with respect to a height direction of the object. It is noted that the reference point may be manually added on the training 2D image, and may indicate a specific feature of the object, such as a corner of the object.

In use, the marked area may be in the form of a rectangle and may be manually added on the training 2D image and serve as a 2D bounding box that completely encloses the object. The marked area may be represented in the form of a set of parameters in the form of:

$$p(x',y',W',h')$$

where (x',y') represents a 2D coordinate set of one vertex of the marked area, W' represents a width of the marked area, and h' represents a height of the marked area.

Specifically, the first angle $\theta_u'$ is defined by a reference line that crosses the reference point and that is parallel to an edge of the marked area (as indicated by a dotted line in FIG. 2) and a first line that originates from the reference point and that extends along the length of the object. The second angle $\theta_w'$ is defined by the reference line and a second line that originates from the reference point and that extends along the width of the object. The third angle $\theta_v'$ is defined by the reference line and a third line that originates from the reference point and that extends along the height of the object.

In use, when an image is first obtained and manually labelled with the reference point (Px', Py') and the marked area, a pre-process operation may be done on the training 2D image so as to obtain the remaining data contained in the depth sub-dataset.

Specifically, the pre-process operation may include the calculating module 13 executing an algorithm for calculating one or more vanishing points that are associated with the object(s) in the training two-dimensional image. Typically, for each object, one to three vanishing points are calculated. In this embodiment, the calculation of the vanishing point(s) involves using a Hough transform algorithm.

Afterward, using the vanishing point(s) and the reference point, the calculating module 13 may proceed to calculate the length, the width and the height of the object within the marked area, the first angle, the second angle and the third angle.

According to one embodiment of the disclosure, there is provided a method for detecting a three-dimensional object in a two-dimensional image. In this embodiment, the method may include a model training process and an object detection process.

Figure 3:
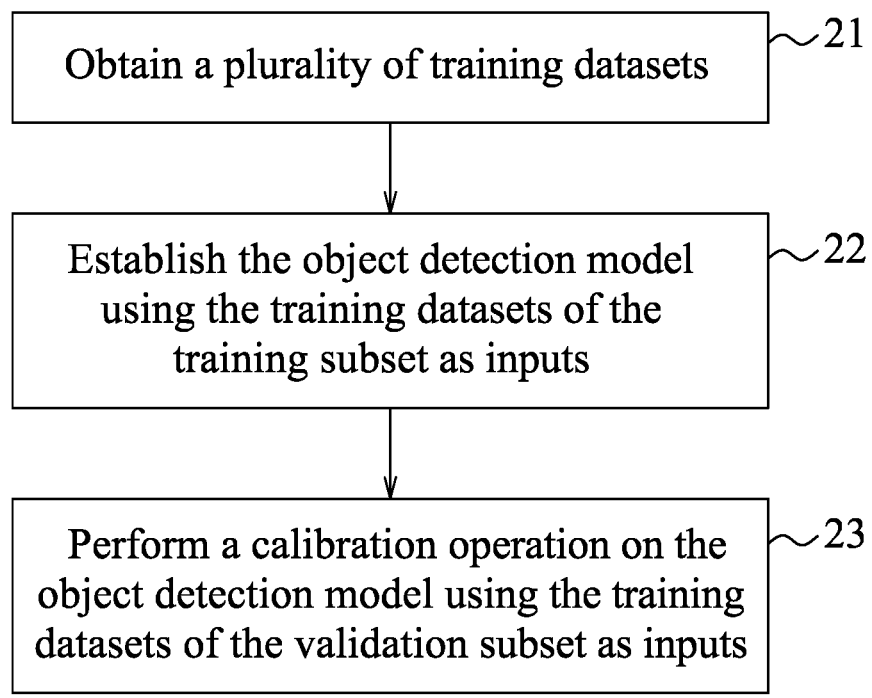
FIG. 3 is a flow chart illustrating steps of a model training process for establishing an object detection model of the method according to one embodiment of the disclosure.

FIG. 3 is a flow chart illustrating steps of the model training process for establishing an object detection model according to one embodiment of the disclosure. In this embodiment, the model training process may be implemented using the system 1 as shown in FIG. 1.

In step 21, the calculating module 13 accesses the storage medium 11 so as to obtain the plurality of training datasets stored therein. Then, the calculating module 13 categorizes the plurality of training datasets into a training subset and a validation subset. In this embodiment, the training subset may include 75 percent of the plurality of training datasets, while the validation subset may include the remaining 25 percent of the plurality of training datasets.

In step 22, the calculating module 13 establishes the object detection model using the training datasets of the training subset as inputs. Specifically, the object detection model may be a convolutional neural network (CNN) model such as YOLO (you only look once) v3 model. In this embodiment, the YOLO v3 model is set up using a neural network framework such as YOLO Darknet, and may be trained using a supervised learning algorithm such as an error back-propagation algorithm.

In step 23, the calculating module 13 performs a calibration operation on the object detection model using the training datasets of the validation subset as inputs. Specifically, the training datasets contained in the validation subset are fed into the object detection model so as to adjust parameters of the object detection model. Afterward, the model training process is completed.

After having been established, the object detection model is available to be used to perform the object detection process.

It is noted that, while in this embodiment, the pre-processing of the training datasets is already implemented, in other embodiments, the model training process may include implementing the manual adding of the reference point and the marked area on 2D images newly obtained by the image capturing module 12 or received via the communication unit 14, and pre-processing the newly obtained 2D images.

Figure 4:
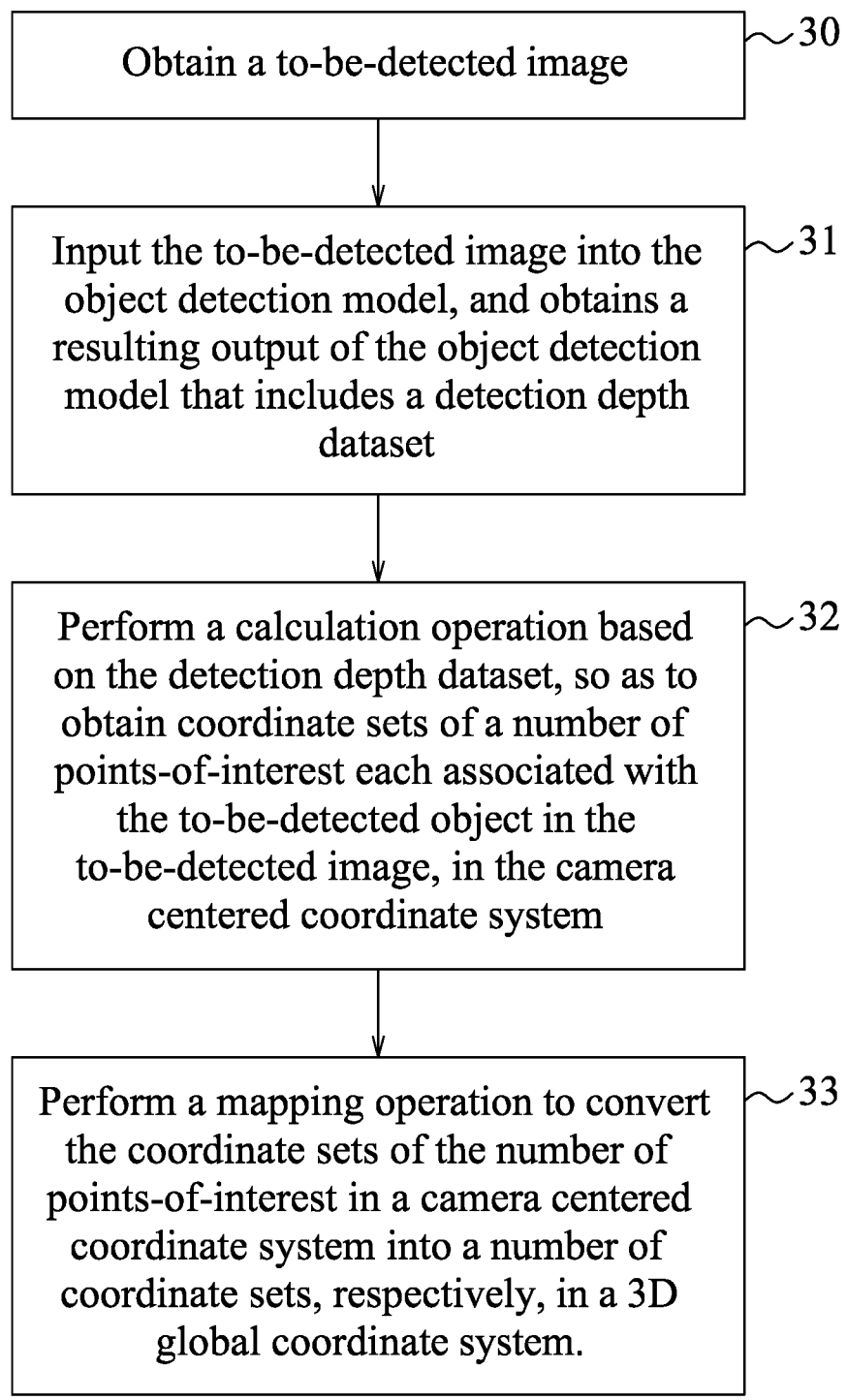
FIG. 4 is a flow chart illustrating steps of an object detection process of the method according to one embodiment of the disclosure.

FIG. 4 is a flow chart illustrating steps of the object detection process according to one embodiment of the disclosure. In this embodiment, the object detection process may be implemented using the system 1 as shown in FIG. 1.

In step 30, the calculating module 13 obtains a to-be-detected image. In this embodiment, the to-be-detected image may be a 2D image obtained by the image capturing module 12 and transmitted to the calculating module 13, a 2D image stored in the storage medium 11 and accessed by the calculating module 13, or a 2D image received via the communication unit 14. The to-be-detected image may include at least one to-be-detected object.

In step 31, the calculating module 13 inputs the to-be-detected image into the object detection model, and obtains a resulting output of the object detection model that includes a detection depth dataset. The detection depth dataset may include a regional subset associated with the to-be-detected object, and a depth marking subset associated with the regional subset. It is noted that in the case that a plurality of to-be-detected objects are present in the to-be-detected image, a plurality of detection depth datasets each associated with a respective one of the to-be-detected object may be obtained.

Figure 5:
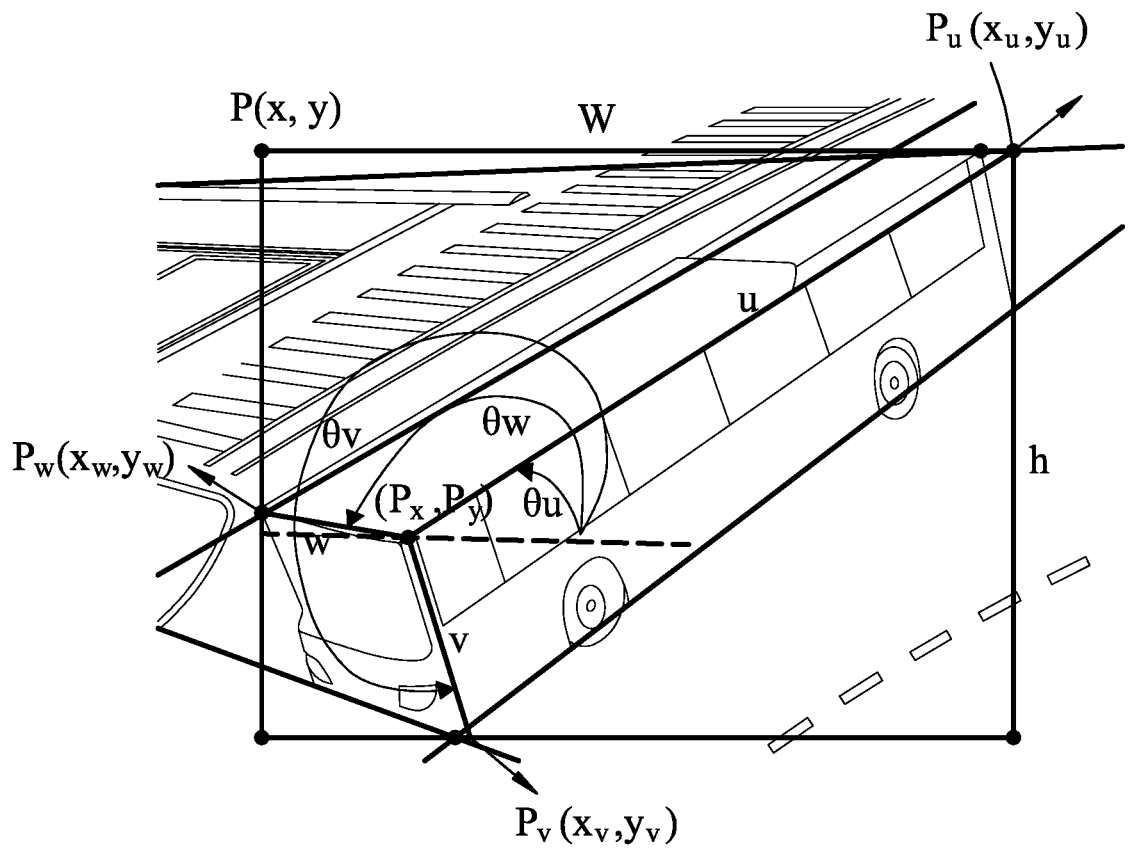
FIG. 5 is an exemplary to-be-detected image that is inputted into an object detection model, with a resulting output being illustrated.

FIG. 5 is an exemplary to-be-detected image that is inputted into the object detection model, with the resulting output being illustrated. The to-be-detected object may be a bus on the road, and the purpose of this disclosure is to "expand" the features of the to-be-detected object in the 2D image from the "2D realm" into the "3D realm" by converting these features into a dataset indicating a 3D object (i.e., a 3D form of the to-be-detected object).

The regional subset may include a reference x-coordinate, a reference y-coordinate, an x-axis distance (W) and a y-axis distance (h). The reference x-coordinate and the reference y-coordinate cooperatively compose a set of reference coordinates p(x,y) on a 2D coordinate system associated with the to-be-detected image. A 2D bounding box can be constructed by using the set of reference coordinates, the x-axis distance (which may be a width of the two-dimensional bounding box) and the y-axis distance (which may be a height of the two-dimensional bounding box) to obtain four sets of coordinates p(x,y), p(x,y−h), p(x+W,y) and p(x+W, y−h). Connecting the four sets of coordinates yields a rectangular 2D bounding box on the to-be-detected image that completely encloses the to-be-detected object. Specifically, the set of reference coordinates p(x,y) may be an upper-left point of the 2D bounding box in this embodiment, and may be other vertices of the 2D bounding box in other embodiments.

The depth marking subset includes a coordinate set of a detected reference point (Px,Py) associated with the to-be-detected object, a length (u) of the to-be-detected object, a first angle $\theta_u$ defined by a reference line that crosses the detected reference point and that is parallel to an edge of the 2D bounding box (as indicated by a dotted line in FIG. 5) and a first line that originates from the detected reference point and that extends along the length of the to-be-detected object, a width (w) of the to-be-detected object, and a second angle $\theta_w$ defined by the reference line and a second line that originates from the detected reference point and that extends along the width of the to-be-detected object, a height (v) of the to-be-detected object, a third angle $\theta_v$ defined by the reference line and a third line that originates from the detected reference point and that extends along the height of the to-be-detected object. It is noted that the length, height and width of the to-be-detected object are represented using a 3D coordinate system, which may be an UVW coordinate system and may be referred to as a camera centered coordinate system. In this embodiment, three axes of the 3D coordinate system are associated with the length of the object, the width of the object and the height of the object, respectively.

Specifically, the detected reference point (Px,Py) in the example of FIG. 5 indicates a corner of the to-be-detected object, and in this embodiment, an example of the detection depth dataset may be in the form of:

$$p(x,y,W,h,Px,Py,u,\theta_u,w,\theta_w,v,\theta_v).$$

Afterward, for each to-be-detected object in the to-be-detected image, the coordinate sets of a number of points-of-interest associated with the to-be-detected object are to be determined. Specifically, in this embodiment, three coordinate sets of three specific points-of-interest are to be determined. Specifically, the three points-of-interest are an intersection of the first line and the 2D bounding box, an intersection of the second line and the 2D bounding box, and an intersection of the third line and the 2D bounding box. In other words, the three points-of-interest each indicate a point of projection of the detected reference point (Px,Py) onto the 2D bounding box along one of the first, second and third lines.

In step 32, the calculating module 13 performs a calculation operation based on the detection depth dataset, so as to obtain coordinate sets of a number of points-of-interest each associated with the to-be-detected object in the to-be-detected image, in the camera centered coordinate system.

Specifically, in the example of FIG. 5, the calculation operation involves calculating the coordinate sets of three specific points-of-interest, labeled as $p_u(x_u,y_u)$, $p_w(x_w,y_w)$, and $p_v(x_v,y_v)$, respectively. The calculations are based on the depth marking subset contained in the detection depth dataset. To be specific, a first one of the points-of-interest is a point of the detected reference point projected onto the 2D bounding box along the first line, and a coordinate set thereof is calculated based on the coordinate set of the detected reference point, the length of the to-be-detected object and the first angle. A second one of the points-of-interest is a point of the detected reference point projected onto the 2D bounding box along the second line, and a coordinate set thereof is calculated based on the coordinate set of the detected reference point, the width of the to-be-detected object and the second angle. A third one of the points-of-interest is a point of the detected reference point projected onto the 2D bounding box along the third line, and a coordinate set thereof is calculated based on the coordinate set of the detected reference point, the height of the to-be-detected object and the third angle.

In this embodiment, the coordinate sets of the points-of-interest may be calculated using the following equations:

$$p_u(x_u,y_u)=(u*\cos \theta_u, u*\sin \theta_u)+(Px,Py),$$

$$p_w(x_w,y_w)=(w*\cos \theta_{uw}, w*\sin \theta_w)+(Px,Py), \text{ and}$$

$$p_v(x_v,y_v)=(v*\cos \theta_v, v*\sin \theta_v)+(Px,Py).$$

It is noted that in embodiments, the coordinate sets of the three points-of-interest may be calculated in an arbitrary order.

In step 33, the calculating module 13 performs a mapping operation to convert the coordinate sets of the number of points-of-interest in a camera centered coordinate system into a number of coordinate sets, respectively, in a 3D global coordinate system.

Figure 6:
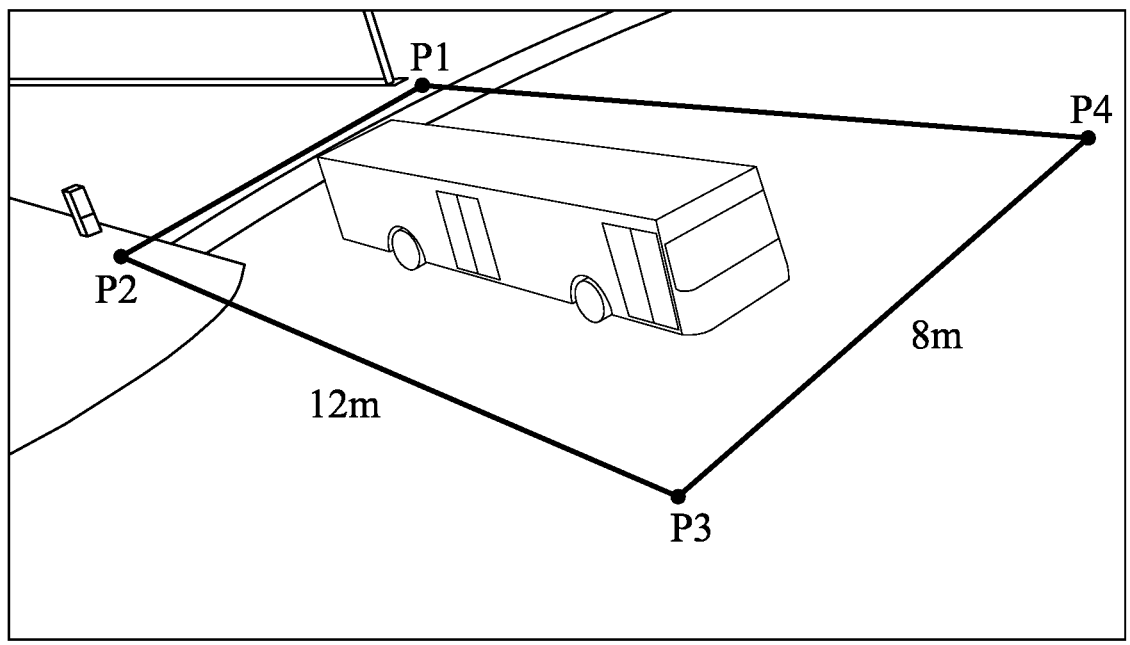
FIG. 6 is an exemplary image with a number of predetermined distances among certain objects being labelled.

Specifically, before the mapping operation, the coordinate sets of the number of points-of-interest in the camera centered coordinate system are obtained. FIG. 6 is an exemplary image with a number of pre-determined actual distances among certain objects being labelled. Also, since a precise location of the image capturing module 12 in the 3D global coordinate system and an actual area of a region contained by each image captured by the image capturing module 12 are known beforehand, it is possible to use the mapping operation to determine where these points-of-interest of the to-be-detected object, which is a 3D object projected onto an 2D image, are located in the 3D global coordinate system.

In use, the calculating module 13 is configured to first derive an actual distance between the image capturing module 12 and the to-be-detected object. Then, using the cross-ratio concept, the calculating module 13 is configured to calculate, based on the width, length and the height of the to-be-detected object, three coordinate sets of the three points-of-interest of the to-be-detected object in the 3D global coordinate system. In this manner, an estimated 3D-shape of the to-be-detected object in the 3D global coordinate system based on the coordinate sets of the points-of-interest of the to-be-detected object is obtained.

The coordinate sets of the points-of-interest of the to-be-detected object in the 3D global coordinate system may then be used in a number of applications. For example, the calculating module 13 may be configured to control the communication unit 14 to transmit the coordinate sets to a cloud server, which may in turn transmit the same to an in-vehicle computer (not depicted in the drawings) for assisting driving of a corresponding vehicle provided with the in-vehicle computer. Additionally, by processing a number of images that are successively obtained by the image capturing module 12, movement of the to-be-detected object may be tracked, and a velocity of the to-be-detected object may be calculated.

To sum up, the embodiments of the disclosure provide a method and a system for detecting a three-dimensional object in a two-dimensional image. In the method, a number of training 2D images are used to train and calibrate an object detection model. Then, the object detection model may be used to process a 2D image to obtain a detection depth dataset that indicates a 2D bounding box, a reference point and a number of lines associated with a width, a length and a height of a to-be-detected object in the 2D image. Then, using the detection depth dataset and the actual location of the image capturing module of the system, coordinate sets of points-of-interest of the to-be-detected object in the 3D global coordinate system may be obtained, so as to determine an estimated 3D-shape of the to-be-detected object in the 3D global coordinate system from the 2D image.

The embodiments of this disclosure may also be utilized in the field of self-driving cars. Specifically, the movements of the self-driving cars may be controlled further based on the images captured by traffic cameras that are installed on roadsides. In some cases, the traffic cameras are implemented using edge AI cameras, and the operations of 3D vehicle recognition using CNN as the object detection model, implemented based on the images of the edge AI cameras, may be done with more accuracy and a higher efficiency. After the method is implemented, information such as the geographic location of the vehicle on a map, a velocity of the vehicle, distances between the vehicle and other objects may be obtained. In addition, the above information obtained with respect to one specific vehicle may be transmitted to other vehicles in proximity, such that the drivers of the other vehicles may be notified of the location of the vehicle, so as to assist the drivers in making decisions such as to avoid the specific vehicle or to take a detour.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for detecting a three-dimensional object in a two-dimensional (2D) image, the method comprising:
inputting a to-be-detected image that includes a to-be-detected object into an object detection model, and obtaining a resulting output of the object detection model that includes a detection depth dataset, the detection depth dataset including a regional subset associated with a 2D bounding box bounding the to-be-detected object and a depth marking subset associated with the regional subset, the depth marking subset including a coordinate set of a detected reference point associated with the to-be-detected object, a length of the to-be-detected object, a first angle defined by a reference line that crosses the detected reference point and that is parallel to an edge of the 2D bounding box and a first line that originates from the detected reference point and that extends along the length of the to-be-detected object, a width of the to-be-detected object, a second angle defined by the reference line and a second line that originates from the detected reference point and that extends along the width of the to-be-detected object, a height of the to-be-detected object, and a third angle defined by the reference line and a third line that originates from the detected reference point and that extends along the height of the to-be-detected object;
performing a calculation operation based on the detection depth dataset, so as to obtain coordinate sets of a number of points-of-interest each associated with the to-be-detected object in the to-be-detected image, in a three-dimensional (3D) camera centered coordinate system; and
performing a mapping operation to convert the coordinate sets of the number of points-of-interest in the 3D camera centered coordinate system into a number of coordinate sets, respectively, in a 3D global coordinate system.

2. The method of claim 1, wherein, in the calculation operation:
a first one of the points-of-interest is a point of the detected reference point projected onto the 2D bounding box along the first line, and a coordinate set thereof is calculated based on the coordinate set of the detected reference point, the length of the to-be-detected object and the first angle;
a second one of the points-of-interest is a point of the detected reference point projected onto the 2D bounding box along the second line, and a coordinate set thereof is calculated based on the coordinate set of the detected reference point, the width of the to-be-detected object and the second angle; and
a third one of the points-of-interest is a point of the detected reference point projected onto the 2D bounding box along the third line, and a coordinate set thereof is calculated based on the coordinate set of the detected reference point, the height of the to-be-detected object and the third angle.

3. The method of claim 2, wherein the coordinate sets of the points-of-interest are calculated using the following equations:

$$p_u(x_u, y_u) = (u^* \cos \theta_u, u^* \sin \theta_u) + (Px, Py),$$

$$p_w(x_w, y_w) = (w^* \cos \theta_w, w^* \sin \theta_w) + (Px, Py), \text{ and}$$

$$p_v(x_v, y_v) = (v^* \cos \theta_v, v^* \sin \theta_v) + (Px, Py),$$

where $p_u(x_u, Y_u)$, $P_w(x_w, Y_w)$ and $p_v(x_v, Y_v)$ represent the coordinate sets of the points-of-interest, respectively, u represents the length of the to-be-detected object, $\theta\_u$ represents the first angle, w represents the width of the to-be-detected object, $\theta\_w$ represents the second angle, v represents the height of the to-be-detected object, $\theta\_v$ represents the third angle, and (Px,Py) represents the coordinate set of the detected reference point.

4. The method of claim 1, further comprising:
obtaining a plurality of training datasets, each of the training datasets including a training 2D image, at least one marked area that is on the training 2D image and that indicates a location of an object in the training 2D image, and at least one depth sub-dataset that is associated with the marked area, the depth sub-dataset including a coordinate set of a reference point, a length of the object, a first angle with respect to a lengthwise direction of the object, a width of the object, a second angle with respect to a widthwise direction of the object, a height of the object, and a third angle with respect to a height direction of the object; and
using the training datasets to implement a model training process for establishing the object detection model.

5. The method of claim 4, wherein the model training process includes:
categorizing the plurality of training datasets into a training subset and a validation subset;
establishing the object detection model using the training datasets of the training subset as inputs; and
performing a calibration operation on the object detection model using the training datasets of the validation subset as inputs.

6. The method of claim 4, wherein the object detection model is a convolutional neural network (CNN).

7. A system for detecting a three-dimensional object in a two-dimensional (2D) image, comprising:
a non-transitory computer readable storage medium;
an image capturing module configured to continuously capture images and to transmit the images to said storage medium; and
a calculating module that is configured to
access said storage medium to obtain a to-be-detected image that includes a to-be-detected object,
input a to-be-detected image into an object detection model, and obtain a resulting output of the object detection model that includes a detection depth dataset, the detection depth dataset including a regional subset associated with a 2D bounding box bounding the to-be-detected object and a depth marking subset associated with the regional subset, the depth marking subset including a coordinate set of a detected reference point associated with the to-be-detected object, a length of the to-be-detected object, a first angle defined by a reference line that crosses the detected reference point and that is parallel to an edge of the 2D bounding box and a first line that originates from the detected reference point and that extends along the length of the to-be-detected object, a width of the to-be-detected object, a second angle defined by the reference line and a second line that originates from the detected reference point and that extends along the width of the to-be-detected object, a height of the to-be-detected object, and a third angle defined by the reference line and a third line that originates from the detected reference point and that extends along the height of the to-be-detected object, perform a calculation operation based on the detection depth dataset, so as to obtain coordinate sets of a number of points-of-interest each associated with the to-be-detected object in the to-be-detected image, in a three-dimensional (3D) camera centered coordinate system, and perform a mapping operation to convert the coordinate sets of the number of points-of-interest in the 3D camera centered coordinate system into a number of coordinate sets, respectively, in a 3D global coordinate system.

8. The system of claim 7, wherein said calculating module is configured to perform the calculation operation in the following manner:

a first one of the points-of-interest is a point of the detected reference point projected onto the 2D bounding box along the first line, and a coordinate set thereof is calculated based on the coordinate set of the detected reference point, the length of the to-be-detected object and the first angle;

a second one of the points-of-interest is a point of the detected reference point projected onto the 2D bounding box along the second line, and a coordinate set thereof is calculated based on the coordinate set of the detected reference point, the width of the to-be-detected object and the second angle; and a third one of the points-of-interest is a point of the detected reference point projected onto the 2D bounding box along the third line, and a coordinate set thereof is calculated based on the coordinate set of the detected reference point, the height of the to-be-detected object and the third angle.

9. The system of claim 8, wherein said calculating module is configured to calculate the coordinate sets of the points-of-interest using the following equations:

$$p_u(x_u,y_u)=(u^*\cos\theta_u, u^*\sin\theta_u)+(Px,Py),$$

$$p_w(x_w,y_w)=(w^*\cos\theta_w, w^*\sin\theta_w)+(Px,Py), \text{ and}$$

$$p_v(x_v,y_v)=(v^*\cos\theta_v, v^*\sin\theta_v)+(Px,Py),$$

where $p_u(x_u, Y_u)$, $P_w(x_w, Y_w)$ and $p_v(x_v, Y_v)$ represent the coordinate sets of the points-of-interest, respectively, u represents the length of the to-be-detected object, $\theta\_u$ represents the first angle, w represents the width of the to-be-detected object, $\theta\_w$ represents the second angle, v represents the height of the to-be-detected object, $\theta\_v$ represents the third angle, and (Px,Py) represents the coordinate set of the detected reference point.

10. The system of claim 7, wherein said calculating module is further configured to:

obtain a plurality of training datasets, each of the training datasets including a training 2D image, at least one marked area that is on the training 2D image and that indicates a location of an object in the training 2D image, and at least one depth sub-dataset that is associated with the marked area, the depth sub-dataset including a coordinate set of a reference point, a length of the object, a first angle with respect to a lengthwise direction of the object, a width of the object, a second angle with respect to a widthwise direction of the object, a height of the object, and a third angle with respect to a height direction of the object; and using the training datasets to implement a model training process for establishing the object detection model.

11. The system of claim 10, wherein said calculating module is configured to implement the model training process by:

categorizing the plurality of training datasets into a training subset and a validation subset;

establishing the object detection model using the training datasets of the training subset as inputs; and performing a calibration operation on the object detection model using the training datasets of the validation subset as inputs.

12. The system of claim 10, wherein the object detection model is a convolutional neural network (CNN).

* * * * *